US010902627B2

(12) United States Patent
    Guignard

(10) Patent No.: US 10,902,627 B2
(45) Date of Patent: Jan. 26, 2021

(54) HEAD MOUNTED DEVICE FOR VIRTUAL OR AUGMENTED REALITY COMBINING RELIABLE GESTURE RECOGNITION WITH MOTION TRACKING ALGORITHM

(71) Applicant: HINS SAS, Paris (FR)

(72) Inventor: Jean-Baptiste Guignard, Bordeaux (FR)

(73) Assignee: HINS SAS, Paris (FR)

( * ) Notice: Subject to any disclaimer, the term of this patent is extended or adjusted under 35 U.S.C. 154(b) by 0 days.

(21) Appl. No.: 16/206,653

(22) Filed: Nov. 30, 2018

(65) Prior Publication Data

US 2020/0175712 A1 Jun. 4, 2020

(51) Int. Cl.
    *G06T 7/70* (2017.01)
    *G06T 7/292* (2017.01)
    *G06F 3/01* (2006.01)

(52) U.S. Cl.
    CPC ............... *G06T 7/70* (2017.01); *G06F 3/012* (2013.01); *G06F 3/017* (2013.01); *G06T 7/292* (2017.01); *G06T 2207/10144* (2013.01); *G06T 2207/10152* (2013.01)

(58) Field of Classification Search
    CPC .... G02B 2027/0138; G02B 2027/0187; G06F 3/012; G06F 3/017; G06K 9/00355; G06T 2207/10144; G06T 2207/10152; G06T 7/292; G06T 7/70
    USPC ......................................... 345/419, 590, 650
    See application file for complete search history.

(56) References Cited

U.S. PATENT DOCUMENTS

| | | | | |
|---|---|---|---|---|
| 2012/0249741 | A1* | 10/2012 | Maciocci | G06F 3/011 348/46 |
| 2015/0212330 | A1* | 7/2015 | Li | G02B 27/0179 345/419 |
| 2015/0261318 | A1* | 9/2015 | Scavezze | G06F 3/0346 345/158 |
| 2016/0007849 | A1* | 1/2016 | Krueger | A61B 3/113 600/301 |
| 2016/0015470 | A1* | 1/2016 | Border | G02B 27/017 600/117 |
| 2016/0378176 | A1 | 12/2016 | Shiu et al. | |
| 2017/0038834 | A1* | 2/2017 | Wilson | G06T 7/215 |
| 2017/0064291 | A1* | 3/2017 | Do | G09G 3/2003 |
| 2017/0357333 | A1* | 12/2017 | Balan | H04N 13/204 |
| 2018/0108145 | A1* | 4/2018 | Miura | H04N 13/344 |
| 2018/0262740 | A1* | 9/2018 | Ross | G06K 9/00604 |
| 2018/0275242 | A1* | 9/2018 | Peri | H04N 5/247 |
| 2018/0329489 | A1* | 11/2018 | Price | G06K 9/2018 |
| 2019/0064923 | A1* | 2/2019 | Taniguchi | G02B 27/01 |
| 2019/0297316 | A1* | 9/2019 | Bleyer | G06F 3/012 |

* cited by examiner

*Primary Examiner* — Tony O Davis
(74) *Attorney, Agent, or Firm* — Greer, Burns & Crain, Ltd.

(57) ABSTRACT

A head mounted device for virtual or augmented reality including:
  a display element configured to display content;
  at least one infrared camera module configured to operate at a predetermined bandwidth;
  an illuminator having a wavelength of operation inside the bandwidth of the infrared camera, and having a field of view before the camera module; and
  a control unit implementing a six degrees of freedom (6DoF) algorithm to determine 6DoF poses from data including image data of the camera module, and implementing a gesture tracking algorithm.

18 Claims, 3 Drawing Sheets

HEAD MOUNTED DEVICE FOR VIRTUAL OR AUGMENTED REALITY COMBINING RELIABLE GESTURE RECOGNITION WITH MOTION TRACKING ALGORITHM

BACKGROUND

The present invention relates to a head mounted device for virtual or augmented reality where a display element is configured to display content. It also concerns a method for performing a 6DoF algorithm and a gesture tracking/recognition algorithm in a head mounted device according to the invention.

With the increase in processing power of electronic devices, it becomes conceivable to explore new dimensions. For example, with the minimisation of components, it is now possible to design smartglasses with augmented reality application. Furthermore, smartphones are now used to experience virtual reality by disposing such a device inside a headset comprising optics and display. Native virtual reality headsets also exist that comprise one or more cameras to experience a full computer-built environment.

Augmented reality (AR) describes user experiences that add 2D or 3D elements to the live view from a device's camera in a way that makes those elements appear to inhabit the real world. Several techniques are already known for generating and interacting 3D objects in augmented reality.

Document US 2016/0378176A1 discloses a Hand And Body Tracking With Mobile Device-Based Virtual Reality Head-Mounted Display. A head-mounted display (HMD) may include a mobile device that includes a display unit, at least one sensing unit and a processing unit. The at least one sensing unit may be configured to detect a presence of an object. The processing unit may be configured to receive data associated with the detecting from the at least one sensing unit, and determine one or more of a position, an orientation and a motion of the object based at least in part on the received data. The HMD may also include an eyewear piece that includes a holder and a field of view (FOV) enhancement unit. The holder may be wearable by a user on a forehead thereof to hold the mobile device in front of eyes of the user. The FOV enhancement unit may be configured to enlarge or redirect a FOV of the at least one sensing unit.

It is also known that the technique of three-degrees-of-freedom (3DOF) only tracks the direction the user is following, whereas a six-degrees-of-freedom (6DOF) detects the orientation and position. The user is therefore accurately localized as the rotational movement and the translational movement are detected.

An object of the present invention is to experience gesture recognition in a virtual or augmented reality apparatus.

It is a further object of the invention not to increase the computational time of a processor, CPU or GPU, when applying gesture recognition.

It is a further object of the invention to propose a built-in device which offers reliability and remains cost-effective.

SUMMARY

At least one of the above-mentioned objects is achieved with a a head mounted device for virtual or augmented reality comprising:
a display element configured to display content,
at least one infrared camera module configured to operate at a predetermined bandwidth,
an illuminator having a wavelength of operation inside the bandwidth of the infrared camera, and having a field of view before the camera module,
a control unit implementing a six degrees of freedom (6DoF) algorithm to determine 6DoF poses from data including image data of the camera module, and implementing a gesture tracking algorithm.

The head mounted device according to the invention may be a headset for virtual reality application. Such a device is configured for motion tracking for immersive mobile virtual reality.

The head mounted device may also be smartglasses for augmented reality.

With the present invention, the use of an infrared camera allows mobile virtual reality and augmented reality applications, and at the same time, a gesture tracking algorithm can be implemented using the illuminator.

Advantageously, the illuminator is integrated or arranged on an extern face of the head mounted device. The illuminator and the infrared camera are cheap component that provides the invention with a competitive and reliable new head mounted device according to the invention. All the components may advantageously be included in the head mounted device.

According to the invention, the infrared camera module comprises:
a lens,
a lens filter having an infrared pass band from 80 nm to 100 nm,
an image sensor.

The camera module is therefore adapted for infrared detection images Preferably, the infrared pass band has a range from 85 nm to 94 nm for example. Others ranges inside this one may be used provided that others components are compatible. Such a range is compatible with a 6DoF algorithm.

In particular, the illuminator may have the same field of view as the field of view of the lens. Thus, object such as a hand for example, which is imaged by the camera may be illuminated by the illuminator in order to be clearly recognized for the gesture tracking algorithm. This algorithm may be used to recognize fingers of a hand, to track the motion of the hand and/or identify a gesture made by the hand.

According to an object of the invention, the image sensor may be a monochrome black and white sensor having a resolution of at least 176×144, preferably of 640*480. The image sensor has a bandwidth at least as wide as the lens filter bandwidth. Preferable the image sensor has a bandwidth from 85 nm to 94 nm.

According to another object of the invention, the lens is a fisheye or a standard (SD) lens.

According to the invention, the illuminator may be a light which is able to emit at any range of non-visible light.

According to further another object of the invention, the illuminator may be a light electroluminescent diode (LED) which is able to emit at 85 nm or any value between 800 and 100 nm.

According to a variant of the invention, the illuminator may be a vertical-cavity surface-emitting laser (vcsel) which is able to emit at 85 nm or any value between 800 and 100 nm.

The illuminator and all components constituting the camera module are designed to be compatible. For example, the image sensor and the lens filter are all set at a similar range of nanometers (800, 850, 900, etc.).

Advantageously, the sensor and the illuminator are physically connected together. A board is preferably provided where the components of the camera module are arranged together with the control unit. This board may comprise pins to connect the illuminator.

According to an embodiment of the invention, the head mounted device may comprise two camera modules and one illuminator, the field of view of the illuminator covering at least the fields of view of said two camera modules.

Preferably, the head mounted device according to the invention comprises two camera modules and two illuminators, the fields of view of the illuminators covering respectively the fields of view of said two camera modules.

According to a preferred embodiment of the invention, the control unit may be configured to activate the illuminator at a framerate lower than the framerate of the camera module, the images detected by the camera module when the illuminator is off being used for implementing the 6DoF algorithm, and the images detected by the camera module when the illuminator is on being used for a gesture tracking algorithm.

Accordingly, among all images detected by the camera, a part is used for the 6DoF algorithm, whereas the other part of images is used for gesture tracking algorithm. The same camera is used for both algorithms, the illuminator being used only for gesture tracking algorithm.

According to another aspect of the invention, it is proposed a method for performing a 6DoF algorithm and a gesture tracking algorithm in a head mounted device for virtual or augmented reality comprising:
 a display element configured to display content,
 at least one infrared camera module configured to operate at a predetermined bandwidth,
 an illuminator having a wavelength of operation inside the bandwidth of the infrared camera, and having a field of view before the camera module,
 a control unit implementing a six degrees of freedom (6DoF) algorithm to determine 6DoF poses from data including image data of the camera module, and implementing a gesture tracking algorithm,
 wherein the control unit is configured to activate the illuminator at a framerate lower than the framerate of the camera module, the images detected by the camera module when the illuminator is off being used for implementing the 6DoF algorithm, and the images detected by the camera module when the illuminator is on being used for a gesture tracking algorithm.

According to an object of the invention, the framerate of the camera module is 60 or 90 frames per second and the framerate of the illuminator is 30 frames per second. Other values can be used, for example 90 fps or 120 fps for the camera, and respectively 45 fps or 60 fps for the illuminator. Other ratios illuminator-framerate/camera-framerate than a half can be used, for example, one third, one quarter or more.

Advantageously, in the case of a framerate of 60 fps, half of images are used for gesture tracking and the other half for 6DoF algorithm. In the case of 90 fps, one third are used for gesture tracking and the other the two-thirds for 6DoF algorithm. It is also possible to consider one third for gesture tracking/gesture recognition, one third for 6DoF algorithm, and one third, illuminated or not, for background subtraction for example.

According to an object of the invention, the method may comprise the step of applying a modification of luminosity and exposure on the images provided for the gesture tracking algorithm.

BRIEF DESCRIPTION OF THE DRAWINGS

For the purpose of illustrating the invention, there is shown in the drawings a form that is presently preferred; it is being understood, however, that this invention is not limited to the precise arrangements and instrumentalities.

DETAILED DESCRIPTION

Figure 1A:
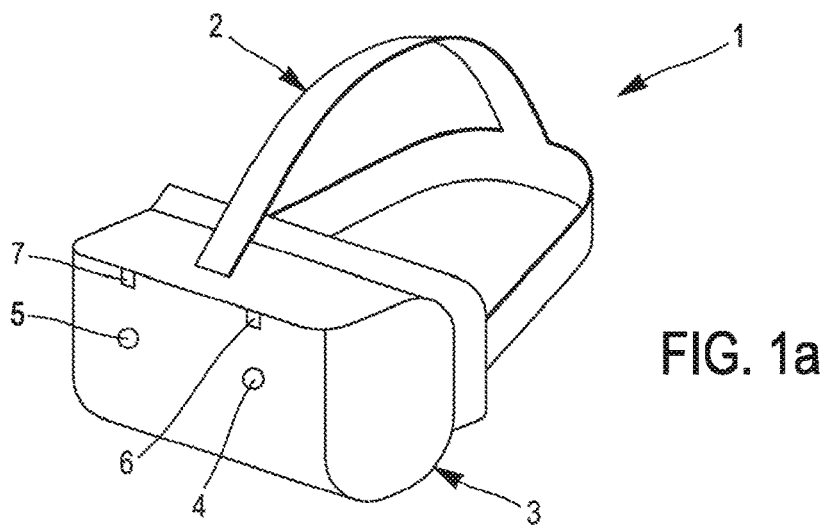
FIG. 1a is a general view of a virtual reality headset comprising two illuminators according to the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

Hereinafter, the present invention will be described in detail by explaining exemplary embodiments of the invention with reference to the attached drawings.

Although the invention is not limited to it, the following description refers to a virtual reality headset but the method and device according to the invention can be applied to augmented reality portable device or to any portable computing device which comprises software and hardware components suitable to implement the invention. The augmented reality device may be AR smartglasses. It is clear for one of ordinary skill in the art that the device according to the invention can be a single apparatus or a combination of apparatuses such as for example a smartphone intended to be inserted in a headset.

In this description, the device according to the invention may comprise one or several camera modules.

FIG. 1a is a general view of a virtual reality (VR) headset 1 according to the invention. The headset is equipped with software and hardware to implement a motion tracking. The headset is intended to be worn by a user all around the eyes. The user can look around a virtual space as if he is actually there.

The VR headset according to the invention provides an accurate position tracking as it uses a six-degrees-of-freedom (6DoF) motion position. It can accurately follow the direction and the position of the user: moving forward, backward, up, down, left, or right.

The band 2 is used to maintain the headset on the head. The front rigid body 3 includes electronic components for the implementation of the invention. Preferably, all components are integrated in the front rigid body 3 in order to optimize compactness, reliability and processing speed.

A first and second infrared cameras 4, 5 are visible from the front side of the headset. Those cameras 4 and 5 are used to capture the environment around the user. According to the invention, illuminators 6 and 7 are provided respectively next to cameras 4 and 5. Preferably, the illuminators are light emitting diodes (LED) each associated to one camera. The association means that the field of view of a LED is centered on the field of view of the corresponding camera.

Figure 1B:
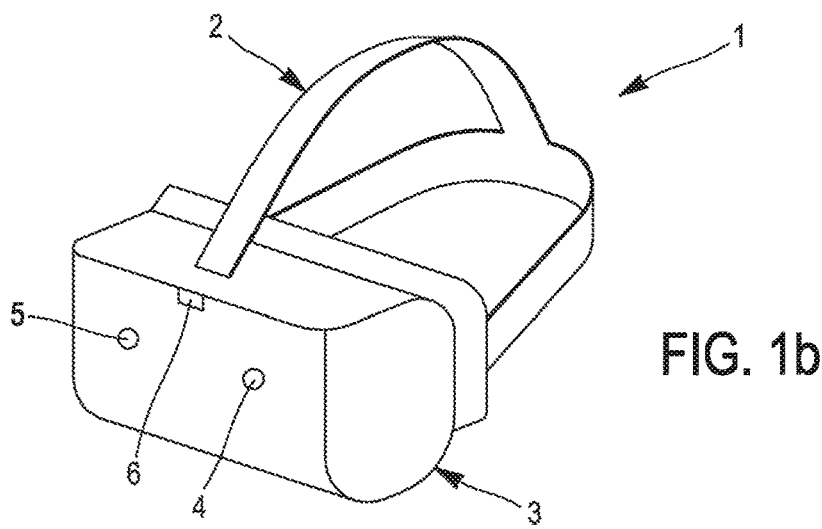
FIG. 1b is a general view of a virtual reality headset comprising one illuminator according to the invention.

FIG. 1b is a general view of a virtual reality headset comprising one illuminator according to the invention. FIG. 1b depicts the same elements as on FIG. 1a but with only one illuminator 6 arranged on the forehead of the headset 1, for example at equal distances from the two cameras 4 and 5.

Figure 2:
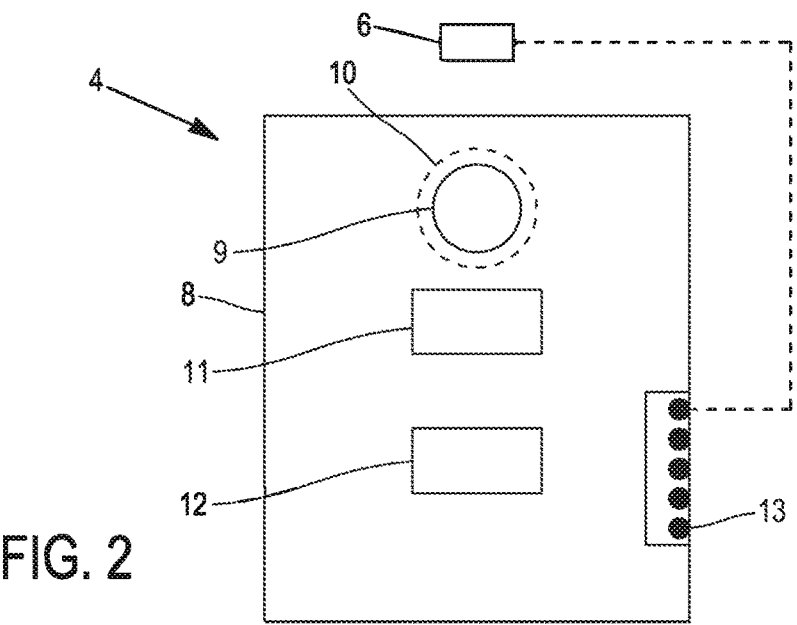
FIG. 2 is a block diagram of some electronic components of the virtual reality headset according to the invention.

FIG. 2 is a block diagram of some electronic components of the VR headset according to the invention. For the sake of simplicity, only one camera module is illustrated.

The infrared camera 4 comprises an electronic board 8 on which a lens 9 and a lens filter 10 are arranged. The lens 9 is of fisheye type, monochrome. The field of view degree may be for example 166 or any other available degree.

The lens filter is designed to have an infrared cut under 85 nm and above 94 nm. An image sensor 11 receives infrared signal from the lens filter and converts it into images, for example black and white images with a resolution of 640*480. Accordingly, the bandwidth of the image sensor includes at least the bandwidth of the lens filter. For example, a CMOS black and white VGA(640*480) image sensor can be used with a bandwidth from 300 to 110 nm for the reception of the infrared signal.

Advantageously a control unit 12 is provided on the board 8 in order to process the images received from the image sensor 11.

With the VR headset 1 mounted to the user, motion of the user's head may be recognized by inertial sensors integrated on the headset or provided outside.

A 6DoF virtual reality application may be in execution by the control unit 11 which can be various processing components such as, but not necessarily limited to, a CPU or a GPU.

A set of pins or connectors 13 allow the connection between the board and others components such as the LED 6. The LED is advantageously controlled in order to render a part of acquired images available for a gesture recognition algorithm.

The board 8 may comprise others types of connectors for data communication and/or for power supply.

Figure 3:
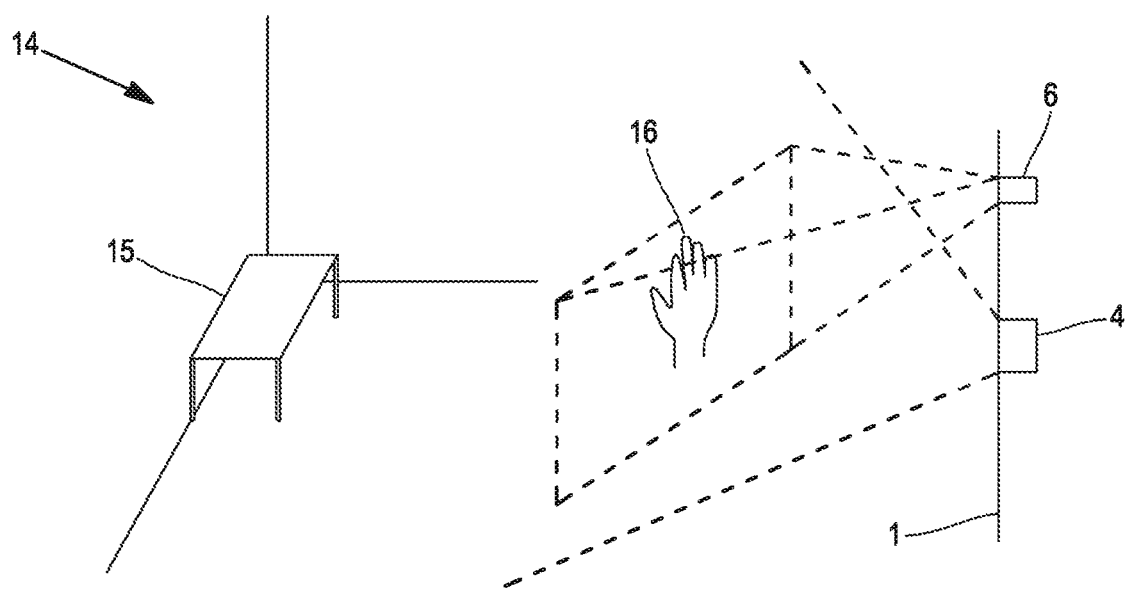
FIG. 3 illustrates an operating environment for determining a 6DoF pose and fingers recognition in one embodiment of the device according to the invention.

FIG. 3 illustrates an operating environment for determining a 6DoF pose and fingers recognition in one embodiment of the device according to the invention. Scene 14 represents the interior of a room where a table 15 stands in a corner. In some embodiments, the VR headset may display a representation of the room from the point of view of the cameras. In some embodiments, the VR headset may display a real time view of the scene that may include graphical overlays or information related to the scene.

Advantageously, when the user places a hand in front of the VR headset, the camera 4 captures infrared images at 60 fps (frames per second). The hand 16 and other elements of the room are visible in said images.

Advantageously, the LED 6 is disposed in the VR headset in such a way as to illuminate any object that is placed in front of the camera 4. For example, the LED 6 is disposed in the vicinity of the camera 4 with a field of view directed in the same direction as the field of view of the camera 4. Additionally, the LED 6 alternately illuminates the hand 16 with a framerate of 30 fps. That means that the hand is illuminated once in two. Advantageously, the illuminated images will be used for performing a gesture recognition process with a high reliability. Graphical overlays resulting from the gesture recognition may then be displayed inside the VR headset for the user.

When only one illuminator is used for two cameras, the field of view of the illuminator is designed to cover an area in front of the headset that superimposes with the fields of view of the two cameras.

Figure 4:
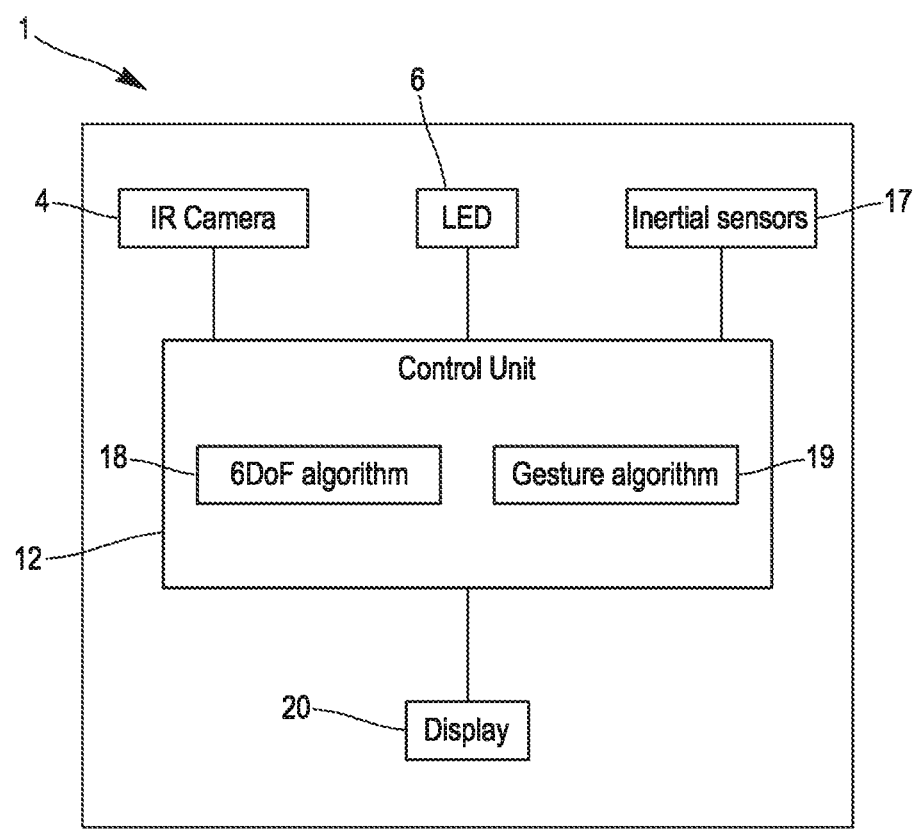
FIG. 4 is a functional block diagram of an exemplary portable device capable of performing the processes according to the present invention.

FIG. 4 is a functional block diagram of an exemplary portable device capable of performing the processes according to the present invention. Only the camera 4 is shown but camera 5 also captures images. The control unit 12 is a processing unit that executes 6 DoF algorithm 18 and gesture algorithm 19. The control unit 12 receives images from the camera 4 (and 5, not shown). The LED 6 may be directly connected to the image sensor of the camera module 4 or controlled the control unit 12. The framerate for the acquisition of images from the camera 4 is divided by two or more and then used to clock the illumination by the LED.

Inertial sensors 17 may also be used for motion tracking application by means of the 6DoF algorithm.

The control unit 12 is configured to execute in parallel a 6DoF algorithm and a gesture recognition algorithm resulting in virtual and/or augmented views in a display 20 with computer-generated elements. The gesture recognition algorithm is used to detect fingers of the moving hand 16 on the FIG. 3. When a gesture is recognized, this could be considered as a setpoint or a command towards an application, such as controlling the image displayed, controlling graphical elements displayed on the image, controlling an audio track of the VR headset, controlling an outside equipment, or the like.

In some embodiments, the 6DoF algorithm and the gesture recognition algorithm may be executed by two or more different processors disposed totally or partially on the board, or disposed out of the board.

Figure 5:
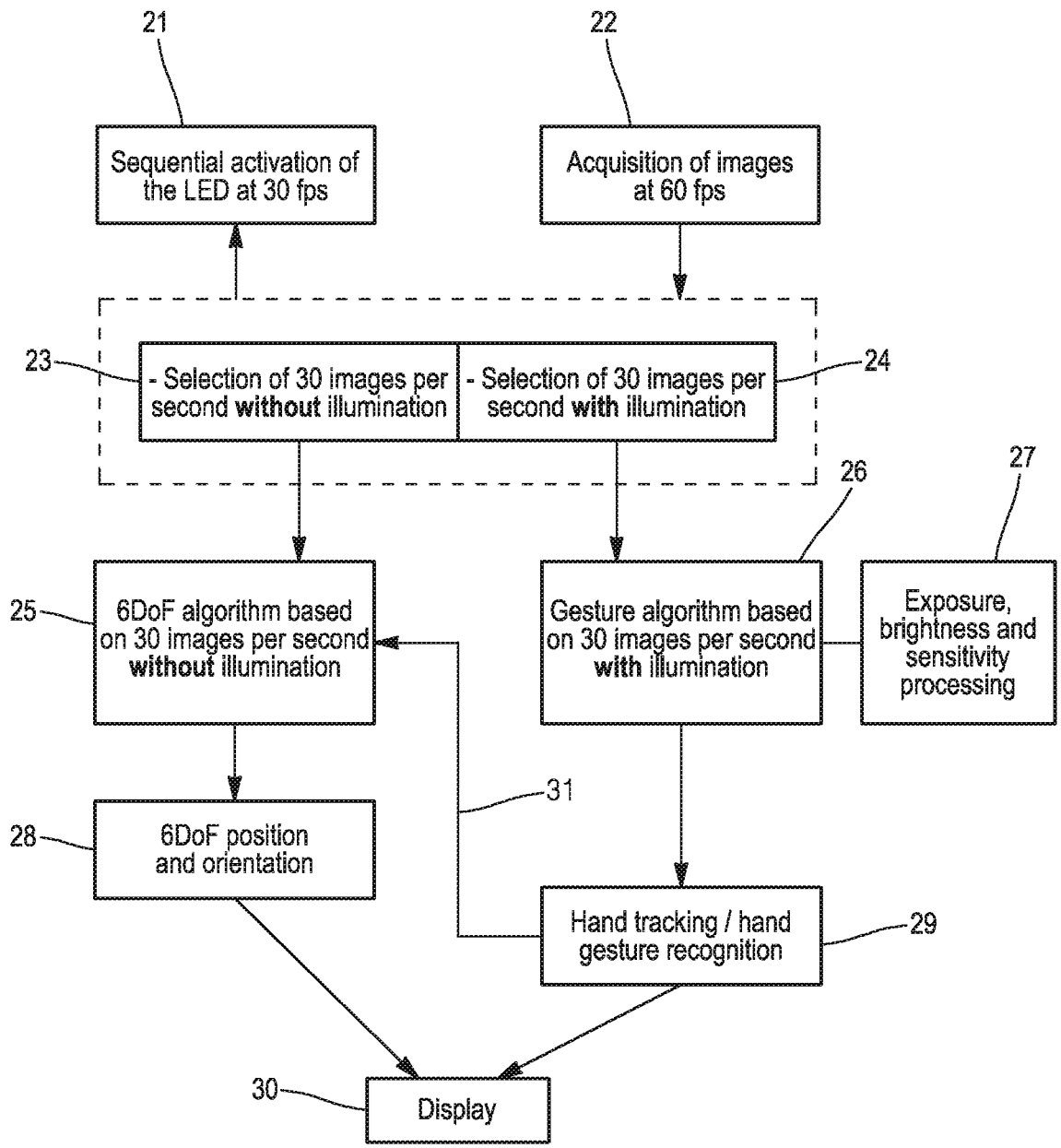
FIG. 5 is a flowchart illustrating a method according to the invention for a portable device, such as the headset of FIG. 1a or 1b, to determine 6DoF pose and gesture pose.

FIG. 5 is a flowchart illustrating a method according to the invention for a portable device, such as the headset of FIG. 1a or 1b, to determine 6DoF pose and gesture pose.

On step 21, the LEDs 6 and 7 are sequentially and synchronously activated at 30 fps. In parallel, on step 22, images are acquired by cameras 4 and 5 at 60 fps. The control unit 12 controls the LEDs and the cameras in order to synchronously illuminate one in two images.

On step 23, the control unit 12 selects 30 images per second that has been illuminated and the other 30 images, in the same second, that has been captured without illumination by the LEDs are selected on step 24.

On step 25, the 6DoF algorithm is applied based on the 30 images obtained without illumination. The result is the determination of 6DoF position and orientation on step 28.

On step 26, the gesture recognition algorithm is applied on the 30 images obtained with illumination of the hand by the LEDs. In some embodiments, the step 25 and 26 may be carried out in parallel or not, by the same processing device or by different processing devices.

An exposure-brightness-sensitivity processing 27 may be carried out for example to supress the background of the acquired images under illumination. Such a processing provides images with a high level of contrast that allows an optimized detection of the fingers during the gesture recognition algorithm of the moving hand 16. The step 29 concerns the algorithm of hand tracking and/or gesture recognition.

Virtual reality or augmented reality images are then displayed on the display 30 together with graphical elements from the gesture recognition. At the same time, set points may be determined as a result of the gesture recognition processing. The link 31 means that set points data are fed to the 6DoF algorithm to act on the displayed images.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations.

Numerous variations and modifications will become apparent to those skilled in the art once the above disclosure is fully appreciated. It is intended that the following claims be interpreted to embrace all such variations and modifications.

The invention claimed is:

1. A head mounted device for virtual or augmented reality comprising:
    a display element configured to display content;
    at least one non-depth infrared camera module configured to operate at a predetermined bandwidth;
    an illuminator having a wavelength of operation inside the bandwidth of the infrared camera, and having a field of view before the camera module; and
    an integrated control unit implementing a six degrees of freedom (6DoF) algorithm to determine 6DoF poses from data including image data of the camera module, and implementing a gesture tracking algorithm.

2. The device according to claim 1, wherein the infrared camera module comprises:
    a lens;
    a lens filter having an infrared pass band from 800 nm to 1000 nm; and
    an image sensor.

3. The device according to claim 2, wherein the infrared pass band has a range from 850 nm to 940 nm.

4. The device according to claim 2, wherein the illuminator has the same field of view as the field of view of the lens.

5. The device according to claim 2, wherein the image sensor is a monochrome black and white sensor having a resolution of at least 176×144.

6. The device according to claim 1, wherein the image sensor is a monochrome black and white sensor having a resolution of 640*480.

7. The device according to claim 2, wherein the lens is a fisheye or a standard lens.

8. The device according to claim 1, wherein the illuminator is a light which is able to emit at any range of non-visible light.

9. The device according to claim 1, wherein the illuminator is a light electroluminescent diode which is able to emit at 850 nm.

10. The device according to claim 1, wherein the illuminator is a vertical-cavity surface-emitting laser (vcsel) which is able to emit at 850 nm.

11. The device according to claim 2, wherein the sensor and the illuminator are physically connected together.

12. The device according to claim 1, wherein the head mounted device comprises two camera modules and one illuminator, the field of view of the illuminator covering at least the fields of view of said two camera modules.

13. The device according to claim 1, wherein it the head mounted device comprises two camera modules and two illuminators, the fields of view of the illuminators covering respectively the fields of view of said two camera modules.

14. The device according to claim 1, wherein the control unit is configured to activate the illuminator at a framerate lower than the framerate of the camera module.

15. A method for performing a 6DoF algorithm and a gesture tracking algorithm in a head mounted device for virtual or augmented reality, comprising:
    a display element configured to display content;
    at least one infrared camera module configured to operate at a predetermined bandwidth;
    an illuminator having a wavelength of operation inside the bandwidth of the infrared camera, and having a field of view before the camera module; and
    a control unit implementing a six degrees of freedom (6DoF) algorithm to determine 6DoF poses from data including image data of the camera module, and implementing a gesture tracking algorithm;
wherein the control unit is configured to activate the illuminator at a framerate lower than the framerate of the camera module, the images detected by the camera module when the illuminator is off being used for implementing the 6DoF algorithm, and the images detected by the camera module when the illuminator is on being used for a gesture tracking algorithm.

16. The method according to claim 15, wherein the framerate of the camera module is 60 or 90 frames per second and the framerate of the illuminator is 30 frames per second.

17. The method according to claim 15, wherein the method further comprises the step of applying a modification of luminosity and exposure on the images provided for the gesture tracking algorithm.

18. A head mounted device for virtual or augmented reality comprising:
    a display element configured to display content;
    at least one infrared camera module configured to operate at a predetermined bandwidth, wherein the camera module includes a fisheye lens;
    an illuminator having a wavelength of operation inside the bandwidth of the infrared camera, and having a field of view before the camera module; and
    a control unit implementing a six degrees of freedom (6DoF) algorithm to determine 6DoF poses from data including image data of the camera module, and implementing a gesture tracking algorithm;
wherein the control unit is configured to activate the illuminator at a framerate lower than the framerate of the camera module, the images detected by the camera module when the illuminator is off being used for implementing the 6DoF algorithm, and the images detected by the camera module when the illuminator is on being used for a gesture tracking algorithm.

* * * * *